US009282236B2

(12) United States Patent
Yuan et al.

(10) Patent No.: US 9,282,236 B2
(45) Date of Patent: Mar. 8, 2016

(54) IMAGING APPARATUS, IMAGING METHOD AND IMAGING SYSTEM

(71) Applicant: HITACHI INDURSTRY & CONTROL SOLUTIONS, LTD., Ibaraki (JP)

(72) Inventors: Li Yuan, Tokyo (JP); Masanori Miyoshi, Tokyo (JP); Tomoaki Nishiguchi, Tokyo (JP)

(73) Assignee: HITACHI INDUSTRY & CONTROL SOLUTIONS, LTD., Ibaraki (JP)

( * ) Notice: Subject to any disclaimer, the term of this patent is extended or adjusted under 35 U.S.C. 154(b) by 74 days.

(21) Appl. No.: 14/311,685

(22) Filed: Jun. 23, 2014

(65) Prior Publication Data

US 2015/0022708 A1 Jan. 22, 2015

(30) Foreign Application Priority Data

Jul. 18, 2013 (JP) .................................. 2013-149025

(51) Int. Cl.
*H04N 5/232* (2006.01)
*G02B 7/36* (2006.01)
*G03B 13/36* (2006.01)

(52) U.S. Cl.
CPC .............. *H04N 5/23212* (2013.01); *G02B 7/36* (2013.01); *G03B 13/36* (2013.01)

(58) Field of Classification Search
CPC ....... H04N 5/23212; G03B 13/36; G02B 7/36
See application file for complete search history.

(56) References Cited

U.S. PATENT DOCUMENTS

| 7,932,493 B2* | 4/2011 | Harada | G01N 23/225 |
| | | | 250/306 |
| 8,878,977 B2* | 11/2014 | Sagisaka | H04N 5/23212 |
| | | | 348/345 |
| 2003/0118245 A1* | 6/2003 | Yaroslavsky | G06T 1/0007 |
| | | | 382/255 |
| 2012/0300056 A1* | 11/2012 | Ban | H01J 37/21 |
| | | | 348/80 |

FOREIGN PATENT DOCUMENTS

| JP | 2009042621 A | 2/2009 |
| JP | 2011-248181 A | 12/2011 |
| JP | 2012-128314 A | 7/2012 |
| JP | 2012-137573 A | 7/2012 |

* cited by examiner

*Primary Examiner* — Daniel M Pasiewicz
(74) *Attorney, Agent, or Firm* — Mattingly & Malur, P.C.; Shrinath Malur

(57) ABSTRACT

An imaging apparatus that performs focus control includes a signal conversion processing part that converts a subject image into a video signal, an image acquisition part that acquires the video signal output from the signal conversion processing part, a focusing area setting part that sets a focusing area as an evaluation value calculation area on an imaging screen acquired by the image acquisition part, an effective range selection part that obtains effective code density in an image of the focusing area with respect to each lens position while moving the lens and determines whether or not the lens position is in an effective range suitable for focusing based on the effective code density, and a focusing degree calculation part that obtains a focusing degree in the lens position when a determination that the lens position is located in the effective range is made in the effective range selection part.

9 Claims, 10 Drawing Sheets

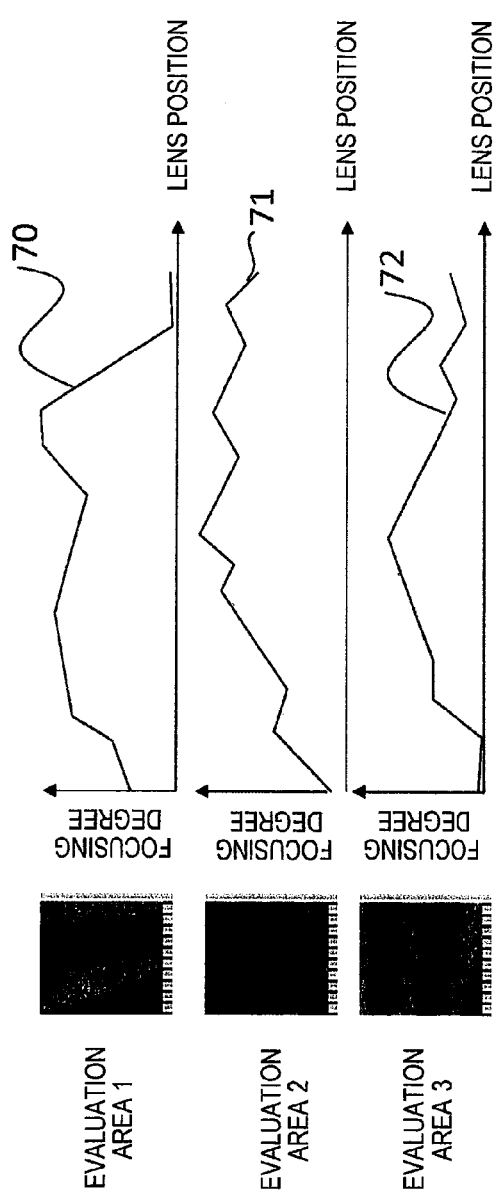
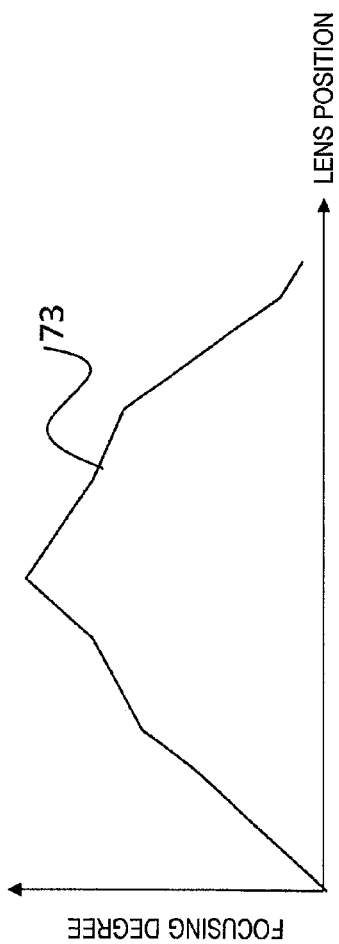
FIG. 7A
FIG. 7B

IMAGING APPARATUS, IMAGING METHOD AND IMAGING SYSTEM

BACKGROUND OF THE INVENTION

1. Field of the Invention

The present invention relates to an imaging apparatus, an imaging method and an imaging system.

2. Description of Related Art

Autofocus is a function of automating focusing of a camera.

The autofocus is performed by control action including two main steps.

First, at step 1, a focusing degree in a focusing area is measured for determination of focusing.

Then, at step 2, a search for a focusing position where the focusing degree becomes maximum is made using the focusing degree measured at step 1. In related art, the hill-climbing search has been often used. As the search method, a method of determining a lens position area with the focusing degree at a predetermined threshold level or higher and moving the lens from the range in a direction in which the gradient of the value of the focusing degree increases has been employed. Further, a fine search is made around the peak for searching for the lens position at the peak.

As a background art of the technology field, JP-A-2009-42621 (Patent Document 1) has disclosed "Imaging means for converting a subject image into an electric signal, and a focus adjustment mechanism that adjusts a focus position of a lens based on an evaluation value calculated from the signal output from the imaging means and representing sharpness of an image are provided. Focus area setting means for setting a focus area as an evaluation value calculation area on an imaging screen, a lens moving means for moving the lens within a range of focus adjustment, and evaluation value calculating means for calculating an evaluation value with respect to each lens position moved by the lens moving means are provided, and an evaluation value acquisition operation for acquiring an evaluation value in each lens position while moving the lens is started from a near side and imaging is performed in the lens position with the evaluation value equal to or more than a predetermined threshold value."

In the autofocus control disclosed in Patent Document 1, there is the following problem.

First, in an imaging environment with a low contrast value such as the case of low illuminance, the value of the focusing degree is susceptible to noise and the true peak position may be erroneously recognized due to noise. Accordingly, it is impossible to control the lens position to an appropriate focusing position and a subject is out of focus.

SUMMARY OF THE INVENTION

Accordingly, an object of the invention is to realize an imaging apparatus, an imaging method and an imaging system that may select a lens position range suitable for focusing from a range in which a lens is movable and accurately perform focusing.

In order to solve the problem, an imaging apparatus that performs focus control according to the invention includes a signal conversion processing part that converts a subject image into a video signal, an image acquisition part that acquires the video signal output from the signal conversion processing part, a focusing area setting part that sets a focusing area as an evaluation value calculation area on an imaging screen acquired by the image acquisition part, an effective range selection part that obtains effective code density in an image of the focusing area with respect to each lens position while moving the lens and determines whether or not the lens position is in an effective range suitable for focusing based on the effective code density, and a focusing degree calculation part that obtains a focusing degree in the lens position when a determination that the lens position is located in the effective range is made in the effective range selection part.

The invention may realize an imaging apparatus, an imaging method and an imaging system that may select a lens position range suitable for focusing from a range in which a lens is movable and accurately perform focusing.

BRIEF DESCRIPTION OF THE DRAWINGS

FIGS. 7A and 7B are diagrams for explanation of focusing degrees and a statistical focusing degree of the evaluation areas obtained in the focusing degree calculation part.

DETAILED DESCRIPTION OF THE EMBODIMENTS

Embodiment 1

As below, an embodiment will be explained using the drawings.

In the embodiment, an example of an imaging apparatus will be explained.

Figure 1:
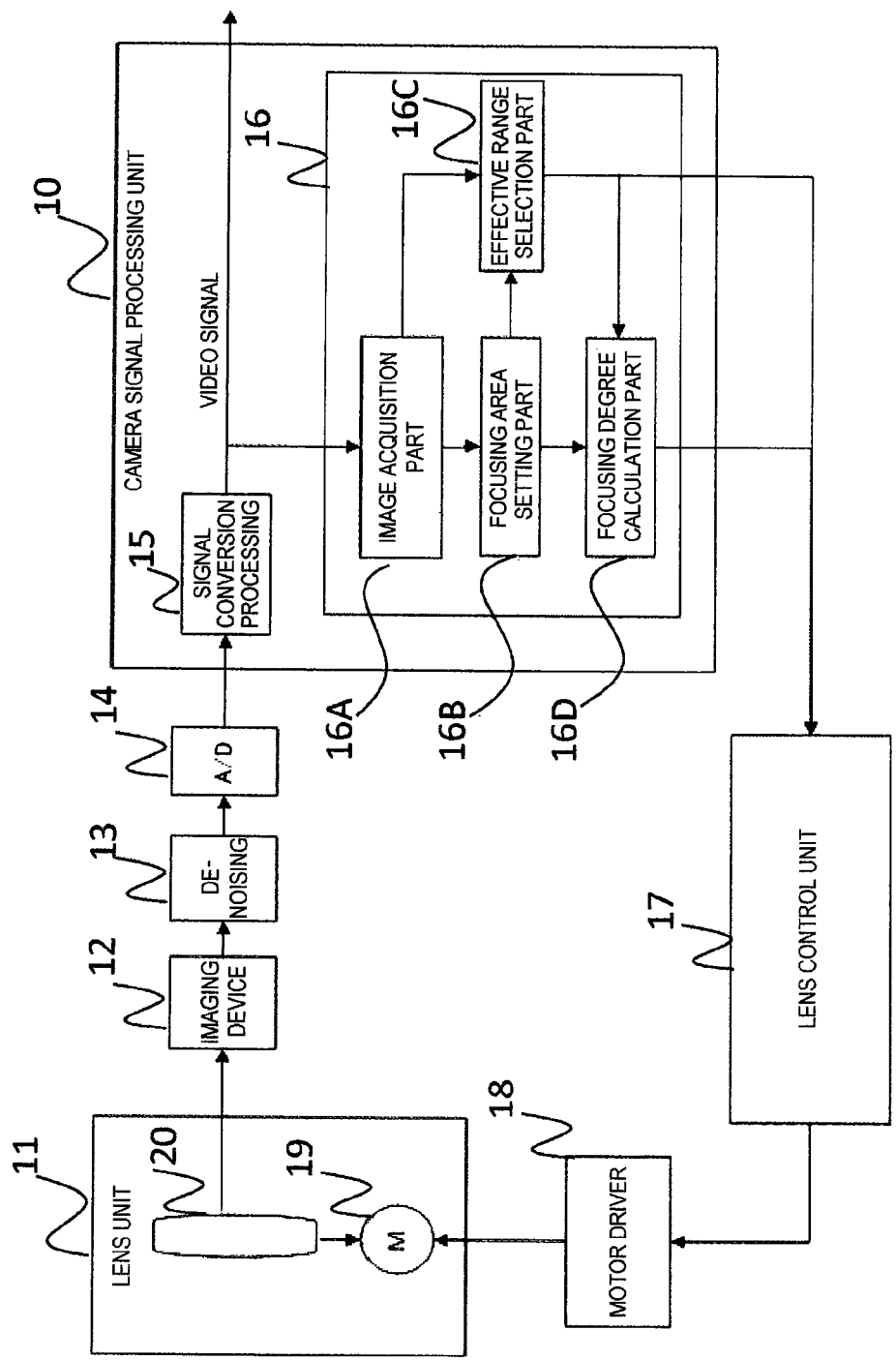
FIG. 1 is an example of a configuration diagram of an imaging apparatus of an embodiment.

FIG. 1 is an example of a configuration diagram of the imaging apparatus of the embodiment.

The imaging apparatus has a camera signal processing unit 10, a lens unit 11, an imaging device 12, a denoising unit 13, an A/D conversion unit 14, a lens control unit 17, and a motor driver unit 18.

The lens unit 11 has a lens 20 and a motor 19 that drives the lens 20, and performs focus control by driving the lens 20.

An image entered from the lens 20 is input to the imaging device 12, an optical image of a subject imaged on a light receiving surface is photoelectrically converted, and the obtained imaging signal is sent out to the denoising unit 13. Then, predetermined denoising processing is performed on the signal in the denoising unit 13, and the signal is digitally converted in the A/D conversion unit 14 and provided as a digital imaging signal to the camera signal processing unit 10.

The camera signal processing unit 10 has a signal conversion processing part 15 and an image processing part 16. The signal conversion processing part 15 performs predetermined signal processing on the supplied digital imaging signal, and thereby, the digital imaging signal is converted into a video signal in the standard signal format compliant with the NTSC (National Television Standards Committee) standard, PAL (Phase Alternating Line) standard, or the like, for example, and output to the outside or the image processing part 16.

The image processing part 16 includes an image acquisition part 16A, a focusing area setting part 16B, an effective range selection part 16C, and a focusing degree calculation part 16D.

The image acquisition part 16A is an imaging device such as a monitoring camera, and loads an image taken by the camera and inputs a video signal to the focusing area setting part 16B.

The focusing area setting part 16B sets an evaluation area for evaluation of focusing from an area of the input image video signal of the camera, and outputs image information of the evaluation area to the effective range selection part 16C and the focusing degree calculation part 16D.

The effective range selection part 16C determines whether the current lens position is suitable for focusing (hereinafter, referred to as "effective range") or not suitable for focusing (hereinafter, referred to as "ineffective range") using the information of the focusing area obtained from the focusing area setting part 16B and the image information obtained from the image acquisition part 16A. The details of the determination method will be described later. The determination result is output to the focusing degree calculation part 16D or/and the lens control unit 17.

The focusing degree calculation part 16D measures the focusing degree of the image taken by the camera based on the image information of the focusing area set in the focusing area setting part 16B. The measured focusing degree is output to the lens control unit 17.

The lens control unit 17 performs control of the lens position based on the information of the effective range and the ineffective range input from the effective range selection part 16C and the result of the focusing degree input from the focusing degree calculation part 16D. The details will be described later, and specifically, when the current lens position is out of the effective range, the focusing degree is not obtained and the lens is moved and, when the current lens position is within the effective range, the maximum value of the focusing degree is searched within the effective range and the lens is moved to the focusing position. By employment of the configuration, the appropriate lens position range suitable for focusing may be selected from the lens movable range and focusing may be accurately performed, and the control for determination of the focusing position may be performed faster. Note that the focusing degree may be obtained even when the lens position is out of the effective range.

A lens control command output from the lens control unit 17 is output to the motor driver 18, and the motor driver 18 drives the motor 19 that drives the lens 20 according to the lens control command and performs focus control.

As below, the image acquisition part 16A, the focusing area setting part 16B, the effective range selection part 16C, the focusing degree calculation part 16D provided in the image processing part 16 will be explained in detail.

First, the focusing area setting part 16B will be explained using FIGS. 2A to 2C and FIG. 1, appropriately.

Figure 2A:
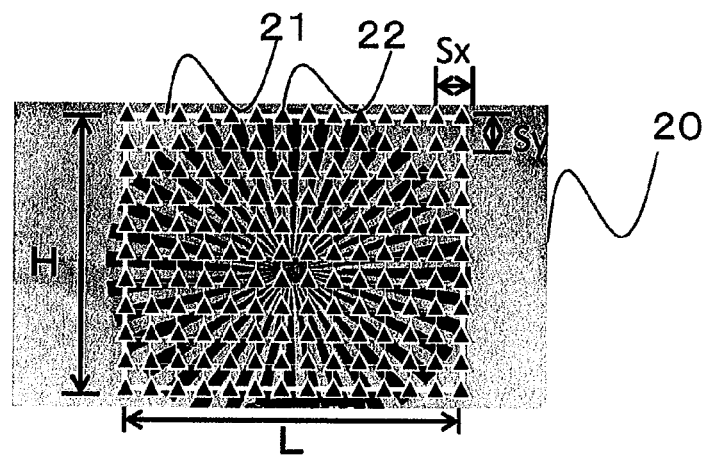
FIGS. 2A to 2C are diagrams for explanation of image processing performed in a focusing area setting part of the embodiment.
Figure 2B:
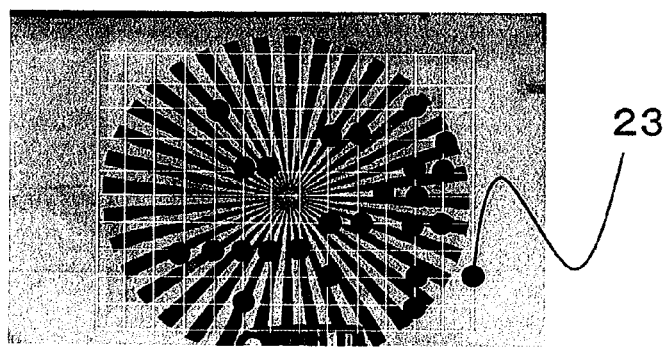
Figure 2C:
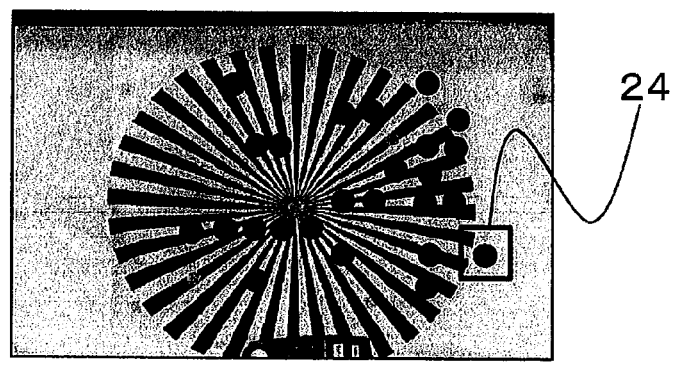

FIGS. 2A to 2C are diagrams for explanation of image processing performed in the focusing area setting part 16B of the embodiment.

FIG. 2A shows a focusing area 21 and sampling points 22 (points with triangles) of an image 20 acquired from the image acquisition part 16A. FIG. 2B shows evaluation points 23 selected from the sampling points 22 using various methods. FIG. 2C shows an evaluation area 24 set around the evaluation point 23.

In the focusing area setting part 16B, first, as shown in FIG. 2A, the image 20 acquired in the camera signal processing unit 10 is input, and the focusing area 21 used when focusing is performed is set. The focusing area 21 can be arbitrarily set. Further, the sampling points 22 are set in the focusing area 21. As the method of setting the sampling points 22, for example, as shown in FIG. 2A, the sampling points 22 may be set in a grid-like pattern in the focusing area 21. Note that the setting of the sampling points 22 is not limited to the method.

Next, as shown in FIG. 2B, of the sampling points 22, the evaluation points 23 used for focusing evaluation of the acquired image 20 is set. Here, as the method of setting the evaluation point 23, setting using edge information of a subject on the image by the Sobel method is considered. As below, the setting of the evaluation points 23 by the Sobel method will be explained.

First, the image is sampled and the processing image 20 is set from formulae (1).

$$x = a \times S_x, \ y = b \times S_y \quad (1)$$

$$0 << a << \frac{L}{S_x}, \ 0 << b << \frac{H}{S_y}, \ a, b \in N \quad (2)$$

Here, (H×L) is a size of the image in the x and y directions. (x,y) are position information of the sampled pixel. $S_x$ is a sampling width of the sampled processing image 20 in the x direction and $S_y$ is a sampling width of the sampled processing image 20 in the y direction. (a,b) are the numbers of sampling widths in the x, y directions. The sampling points 22 are set as described above, and thereby, calculation cost in focusing evaluation may be reduced.

Then, of the sampling points 22, the evaluation points 23 effective for the focusing evaluation are extracted from the image using the formula (3) and formula (4).

$$h_x = \begin{bmatrix} -1 & 0 & 1 \\ -2 & 0 & 2 \\ -1 & 0 & 1 \end{bmatrix} \ h_y = \begin{bmatrix} -1 & -2 & -1 \\ 0 & 0 & 0 \\ 1 & 2 & 1 \end{bmatrix} \ h_{xy} = \sqrt{(h_x^2 + h_y^2)} \quad (3)$$

$$P(x, y) = \begin{cases} \text{Feature} & h_{xy} \geq \text{Threshold} \\ \text{Point} & \\ \text{Others} & h_{xy} < \text{Threshold} \end{cases} \ \text{Threshold} \in [0, 510] \quad (4)$$

Here, $h_x$ is a horizontal filter. $h_y$ is a vertical filter. The edge strength $h_{xy}$ is obtained by local product-sum operation using the two filters.

The edge strength obtained using the formulae 3 is selected as the evaluation point 23 if it exceeds a threshold using the formulae 4. In this manner, the part with the high edge strength may be extracted as the evaluation point 23 using the formulae 3 and the formulae 4. The evaluation point with the high edge strength is selected, and thereby, an advantage that change from defocusing to focusing may be easily recognized is obtained.

Note that the area setting method in the focusing area setting part 16B is not limited to the above described Sobel method, but, for example, the area of the whole image may be set as the area. Further, the existence of the subject at the center of the image may be estimated and the center may be set as the center area. Furthermore, the methods of setting nine and five evaluation points currently used in many cameras are considered.

Subsequently, FIG. 2C shows an evaluation area 24 set with the evaluation point 23 at the center based on the set evaluation point 23. The evaluation area 24 is an area with an arbitrary number of pixels around the evaluation point 23. The information of the set evaluation area 24 is output to the focusing degree calculation part 16D.

Note that, for calculation of the focusing degree, the image information of the focusing area 21 may be used or image information of one or more evaluation areas 24 may be used.

Next, the effective range selection part 16C will be explained.

First, the effective range suitable for focusing and the ineffective range unsuitable for focusing within the movable range of the camera lens will be explained using FIG. 3.

Figure 3:
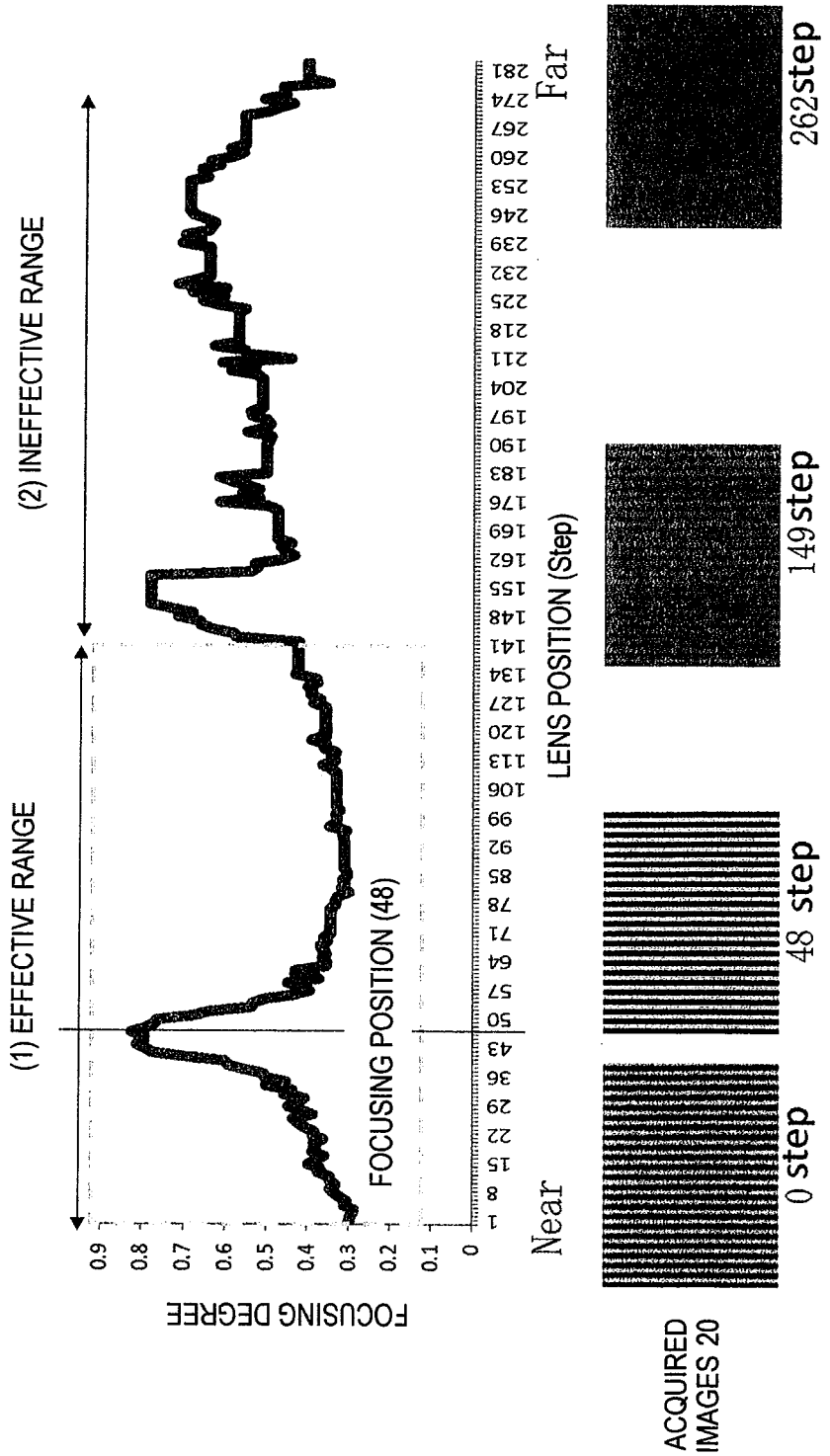
FIG. 3 shows examples of focusing degrees in a movable range of a lens of a camera, (1) an effective range and (2) an ineffective range in the movable range, and acquired images in given lens positions with 48 steps of focusing positions.

FIG. 3 shows examples of focusing degrees in the movable range of the lens of the camera, (1) an effective range and (2) an ineffective range in the movable range, and acquired images 20 in given lens positions with 48 steps of focusing positions.

As shown in FIG. 3, the lens movable range may be roughly divided into the following two ranges.

(1) Effective range: The effective range refers to a range in which image edge information exists to some degree. Here, the example of the effective range with 0 step to 141 step is shown. When the lens is located from the Near position to the focusing position, the focusing degree tends to increase and the image changes from the defocused state to the focused state. That is clear because the acquired image 20 at 0 step is slightly blurred and the acquired image 20 at 48 step is focused. Then, in the focusing position (48 step), the focusing degree reaches the maximum value. Subsequently, when the lens moves from the focusing position in the Far direction, the focusing degree tends to decrease and the image returns from the focused state to the blurred state again. That is clear because the acquired image 20 is focused at 48 step, but the acquired image 20 at 149 step is defocused.

(2) Ineffective Range: The ineffective range refers to a range in which there is no focusing position (48 step in FIG. 3) with less edge information. In the ineffective range, as the lens moves closer to far, the image is further blurred. That is clear because the acquired image 20 at 48 step is focused and the acquired image 20 is getting blurred from 148 step to 262 step.

As described above, in an imaging environment with a low contrast value such as the case of low illuminance, the value of the focusing degree is susceptible to noise, the focusing degree becomes higher in the lens position not the peak position, and the focusing position may be erroneously recognized. For example, the peak around 155 step in FIG. 3 is an example. Further, in the blurred image, the amount of information of the edge or the like is reduced and the change in the direction of brightness change between the pixel for focusing evaluation and the adjacent pixels is less, and thereby, the focusing degree may become higher as a whole. In this case, in the focusing search method in related art, the lens is moved in the lens movable range, the focusing degree is calculated with respect to each lens position, and the maximum value of the focusing degree is searched, and thereby, the noise existing within the ineffective range may be erroneously recognized as a peak or it may be impossible to appropriately search for the focusing position.

Accordingly, in the embodiment, in order to prevent the above described erroneous recognition of the peak as the focusing position, whether or not the lens position is within the effective range is determined and, if the position is within the effective range, focus control of the lens position is performed. According to the configuration, even when there is the higher focusing degree in the ineffective range, the focusing position is searched with reference to the higher focusing degree in the ineffective range, and the erroneous recognition of the focusing position of the lens may be prevented and the lens position range suitable for focusing may be selected from the lens movable range and focusing may be accurately performed.

Further, the configuration of obtaining the focusing degree and searching for the maximum value of the focusing degree when the position is within the effective range and not obtaining the focusing degree when the position is within the ineffective range is employed, and thereby, the erroneous recognition of the focusing position of the lens may be prevented and the time to focus may be reduced.

As below, the method of acknowledging the effective range and the ineffective range in the effective range selection part 16C will be explained. For acknowledgement of the effective range and the ineffective range, the feature that many pieces of image edge information exist in the effective range and image edge information is lost in the ineffective range is used. Specifically, quantitative evaluation of the edge information of the evaluation area 24 obtained by the focusing area setting part 16B is considered.

When the edge information is quantitatively evaluated, the method using the brightness gradient of the edge is often used. However, the brightness gradient is to measure the strength of the brightness change of the pixel, and varies depending on the illumination and is not appropriate particularly under the low illuminance environment.

Accordingly, in the embodiment, the edge information is quantitatively evaluated using, not the brightness itself, but "orientation code" obtained by quantization of the brightness gradient orientation in which the brightness change between an arbitrary pixel and the adjacent pixel to the arbitrary pixel is the maximum. The quantification of the edge information is harder to be affected using the orientation code even when the illuminance varies.

As below, the orientation code obtained in the effective range selection part 16C will be briefly explained using FIGS. 4A to 4E.

FIGS. 4A to 4E show examples of orientation-coding of an arbitrary pixel P(x,y) 41 in an arbitrary evaluation area 40 (x,y).

Figure 4A:
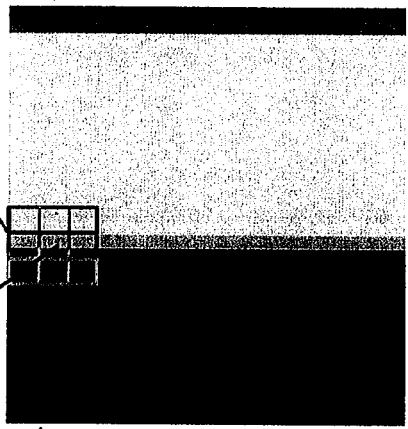
FIGS. 4A to 4E show examples of orientation-coding of an arbitrary pixel P(x,y) of an arbitrary evaluation area (x,y).

FIG. 4A shows setting of adjacent 3×3, 9 pixels around the arbitrary pixel P(x,y) 41 in the arbitrary evaluation area 40 (x,y) as a local area 42.

Figure 4B:
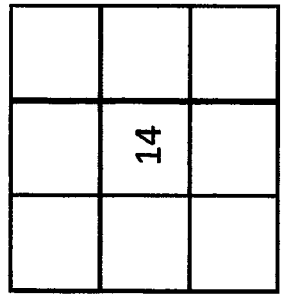

FIG. 4B shows the local area 42 of adjacent 3×3, 9 pixels around the arbitrary pixel P(x,y) 41.

Figure 4C:
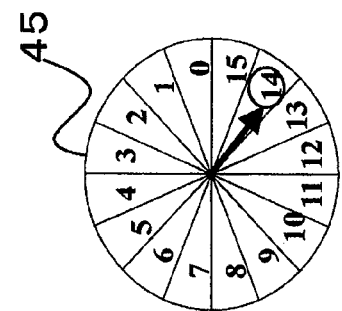

FIG. 4C shows brightness values in the respective pixels of the local area 42. A brightness gradient orientation 43 represents a direction and a magnitude of a brightness difference between the center pixel 41 and the adjacent pixel 44 to the center pixel 41, and a brightness gradient orientation in which the magnitude of the brightness difference is the maximum of the brightness differences obtained in FIG. 4C. By quantization of the brightness gradient orientation 43, the orientation code (FIG. 4E) is obtained.

Figure 4D:
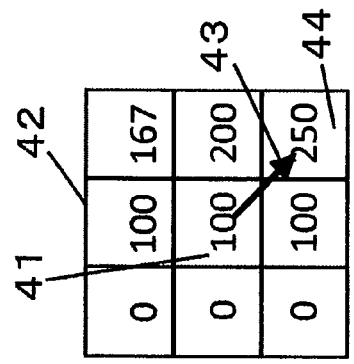
Figure 4E:
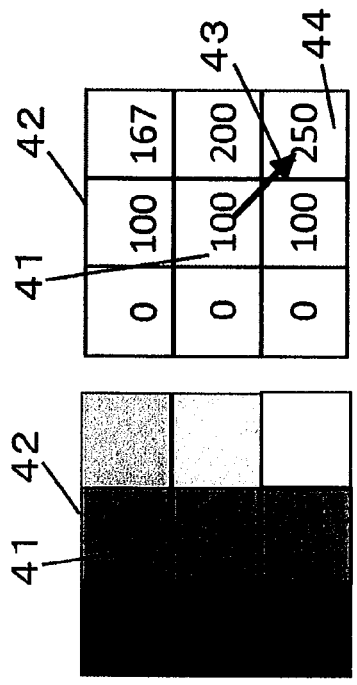

FIG. 4D shows an orientation code chart 45 used when the orientation code is obtained. The orientation code is cyclically defined like the clock going around from 12 o'clock to 0 o'clock, and converted into an orientation code i (i=0, 1, ..., N). Here, the example of N=16 is shown. The brightness gradient orientation 43 shown in FIG. 4C is orientation-coded into i=14 shown in FIG. 4D. The orientation code is obtained with respect to each pixel.

Of the orientation codes i defined in the respective pixels, the codes orientation-coded to N (N=16 in the embodiment) because the brightness difference from the adjacent pixel is smaller than the threshold are referred to as "ineffective codes". On the other hand, the orientation codes i (i=0, 1, ..., N−1) (i=0, 1, ..., 15 in the embodiment) representing the brightness gradient orientations of the other brightness changes are referred to as "effective codes". It is known that the pixels coded to the effective codes have the larger amounts of edge information because the brightness differences are larger than the threshold. On the other hand, it is known that the ineffective codes have the lower contrast in the adjacent pixel than the threshold, i.e., the lower amount of edge information.

The above-described orientation-coding processing is performed on the pixels of the evaluation area 40, and the effective code or the ineffective code is set with respect to each pixel.

Figure 5A:
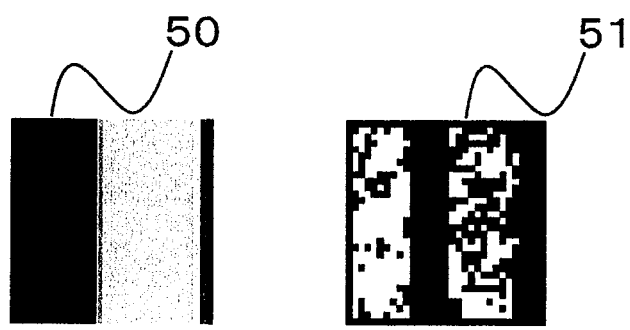
FIGS. 5A and 5B are orientation-coded images based on effective codes and ineffective codes.
Figure 5B:
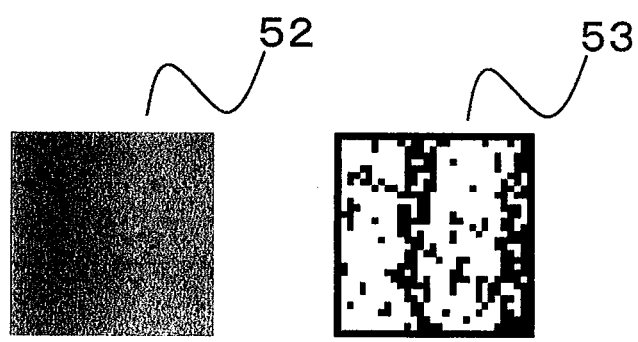

FIGS. 5A and 5B are orientation-coded images based on effective codes and ineffective codes obtained with respect to each pixel using the method in FIGS. 4A to 4E. FIG. 5A shows a focused image 50 in a focused state and an orientation-coded image 51 of the focused image 50, and FIG. 5B shows a defocused image 52 in a defocused state and an orientation-coded image 53 of the defocused image 52.

In the orientation-coded images 51, 53, white pixels represent ineffective codes coded to N in orientation codes. On the other hand, black pixels represent effective codes. In comparison between the orientation-coded image 51 and the orientation-coded image 53, it is known that the ratio of the effective codes (black pixels) with respect to the pixel area is higher in the focused image 51 than in the defocused image 52. That is, when the ratio of effective pixels is larger, the determination that the amount of edge information available for focusing determination within the area is larger and the state is suitable for focusing may be made. On the other hand, when the ratio of effective pixels is smaller, it is known that the amount of edge information available for focusing determination within the area is smaller and the state is the defocused state unsuitable for focusing. As described above, in the embodiment, the effective code or the ineffective code is set with respect to each pixel, and thereby, the amount of edge information of the image may be appropriately recognized even under the low illuminance.

In order to quantitatively evaluate the amount of edge information, density of effective codes is evaluated within a local area as an example of the embodiment. The density $\rho_{xy}$ of effective codes may be defined by the formula (5). Here, M is the total number of pixels of an evaluation area 50 and $h_{xy}(N)$ is an appearance frequency of the pixel determined as being an ineffective code.

$$\rho_{xy} = \frac{M^2 - h_{xy}(N)}{M^2} \quad (5)$$

In the formula (5), the appearance frequency of ineffective code is counted and the effective code density $\rho_{xy}$ is obtained because shortening of the processing time may be expected when the appearance frequency of effective code is higher. Note that the effective code density $\rho_{xy}$ may be obtained by directly obtaining the appearance frequency of effective code. In this manner, the effective code density $\rho_{xy}$ is used, and thereby, the edge information may be quantitatively evaluated regardless of the size of the evaluation area.

Note that, in the case of a predetermined size of the evaluation area, absolute values of effective codes and ineffective codes may be used in place of the effective code density $\rho_{xy}$.

Figure 6:
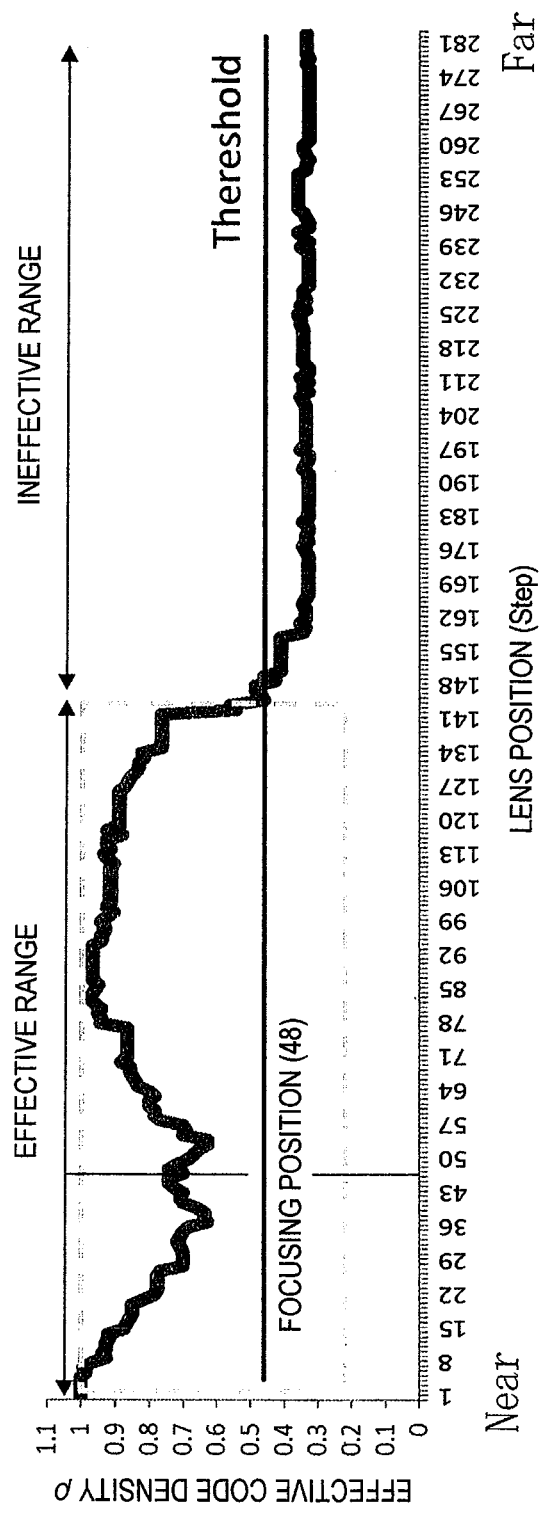
FIG. 6 shows a plot of effective code density within a local area in the evaluation area obtained with respect to the lens movable range.

FIG. 6 shows a plot of effective code density within a local area in the evaluation area obtained based on the formula (5) with respect to the lens movable range.

The determination of an ineffective range or an effective range is performed by setting a threshold for the effective code density and determining the lens position range having the larger effective code density than the threshold as being an effective range and the lens position range having the smaller effective code density as being an ineffective range. For the determination, the determinations are respectively made from Near and Far ends of the lens.

$$P(\rho_{xy}) = \begin{cases} \rho_{xy} \geq \text{Threshold} & P = \begin{array}{c}\text{Effective}\\\text{Position}\end{array} \\ \rho_{xy} < \text{Threshold} & P = \begin{array}{c}\text{Ineffective}\\\text{Position}\end{array} \end{cases} \quad (6)$$

Here, Threshold is a threshold of the effective code density.

In this manner, when the effective range suitable for focusing is determined, the range is output to the lens control unit 17 and the focusing degree calculation part 16D. As the effective code density used for determination of the effective range or the ineffective range, a statistical value of a plurality of evaluation areas may be used or effective code density of an arbitrary evaluation may be used.

FIGS. 7A and 7B are diagrams for explanation of focusing degrees and a statistical focusing degree of the evaluation areas 24 obtained in the focusing degree calculation part 16D.

To the focusing degree calculation part 16D, information of the focusing area from the focusing area setting part 16B and an effective range selection result, which will be described later, from the effective range selection part 16C are input. In the case of the determination as being the effective range, the focusing degree is obtained in the following manner.

FIG. 7A show the respective focusing degrees 70 to 72 of three evaluation areas (referred to as evaluation areas 1 to 3 in the following explanation) as arbitrary evaluation areas of the evaluation points 23 set in the focusing area setting part 16B. FIG. 73 shows a statistical focusing degree 73 of the respective focusing degrees 70 to 72 in the evaluation areas 1 to 3. The statistical focusing degree 73 is obtained based on the formulae 7 from the focusing degrees 70 to 72 in the focusing degree calculation part 16D. In the formulae 7, representative values are calculated by averaging the focusing degrees of all evaluation areas at the focusing degrees 70 to 72.

$$C = \frac{1}{N}\sum_{p=1}^{N} C_p, \ p \in \left\{ P = \begin{array}{c}\text{Feature}\\\text{Point}\end{array} \right\} \quad (7)$$

Thus obtained statistical focusing degree 73 is output to the lens control unit 17.

The lens control unit 17 searches for the maximum value of the focusing degree using the focusing degrees measured in the focusing degree calculation part 16D in the effective range obtained in the effective range selection part 16C. On the other hand, when the range is obtained as the ineffective range in the effective range selection part 16C, the lens is moved without obtaining the focusing degree. Note that, in the case of the ineffective range, the focusing degree may be obtained and the lens may be moved.

The lens position with the maximum value is output as the focusing position. The lens control unit 17 may use the hill-climbing calculation method or a method of simply searching for the maximum value of the focusing degree.

Note that, by the hill-climbing calculation method in related art, the local maximum value may be recognized as the focusing position in the case of low illuminance. In order to solve the problem, use of the golden section method that is robust with a stable number of searches is considered. The golden section method is a method of determining the search direction using only the focusing degrees without using the increase in gradient unlike the hill-climbing method. Further, the maximum value is obtained by narrowing the search area using the golden ratio. Here, "golden ratio" is $1:1.61803((\sqrt{5}-1)/2)$, and the ratio is divided at the internal division point and expressed by $0.38197:0.61803$. Accordingly, the method is robust for minute variations of values in the local area and may search for the maximum value from the search area. Further, the method is characterized in that, when the search range is determined, the same search position is reached.

Figure 8:
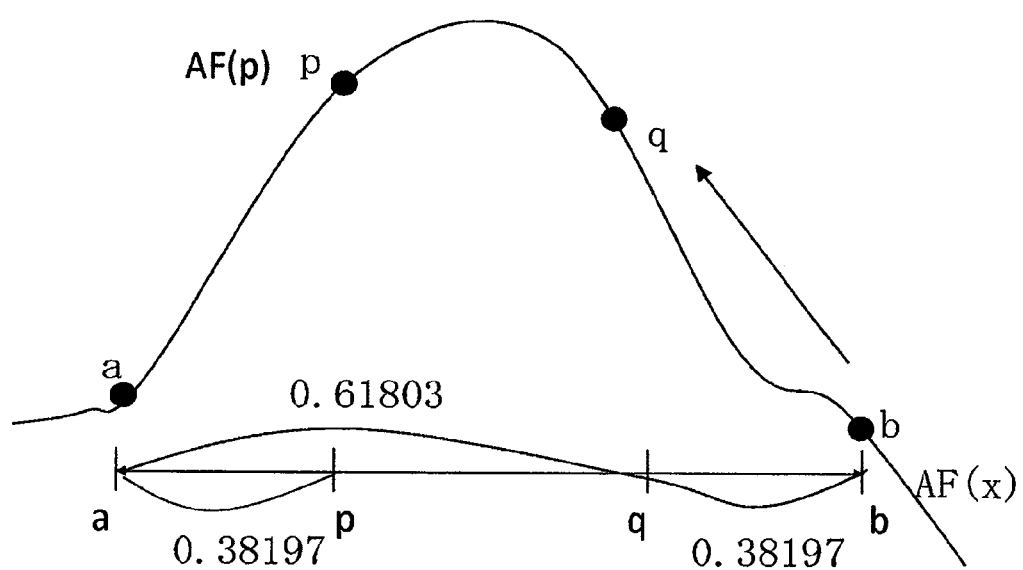
FIG. 8 is a diagram for explanation of a search method for the maximum value using the golden section method.

FIG. 8 is a diagram for explanation of the search method for the maximum value using the golden section method.

Step 1: a as a start position of an effective area narrowed from Near and b as an end position of the effective area narrowed from Far are designated and $\tau=0.61803>0$ is determined.

Step 2: given that $p=b-\tau(b-a)$ $q=a+\tau(b-a)$, and focusing degrees $AF(p)$, $AF(q)$ in the positions of p, q are calculated.

Step 3: if $b-a<\epsilon$, the method ends.

Step 4: if $AF(p)>AF(q)$, $a=p$, $p=q$, $q=a+\tau(b-a)$, if $AF(p)<AF(q)$, $b=q$, $q=p$, $p=b-\tau(b-a)$, and $AF(x)$ is the calculation method of the focusing degree.

Step 1 to step 4 are repeated until ending at step 3, and thereby, the maximum value may be obtained.

Figure 9:
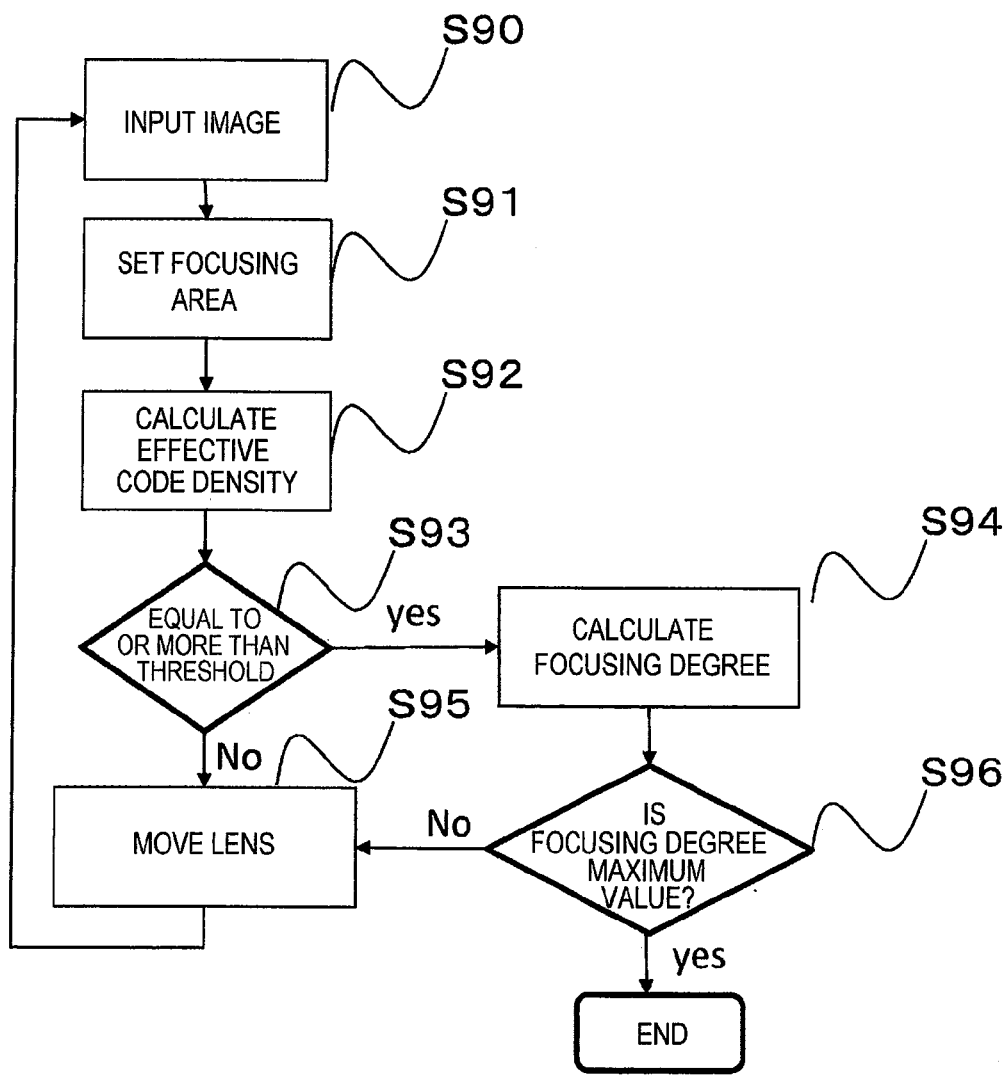
FIG. 9 shows a processing flow in the embodiment.

FIG. 9 shows a processing flow in the embodiment.

First, in the image acquisition part 16A, the image acquired by the imaging apparatus is input (S90).

Then, in the focusing area setting part 16B, the focusing area in which focusing is evaluated is set (S91). Then, in the effective range selection part 16C, the effective code density is obtained with respect to the image in the focusing area (S92). In the effective range selection part 16C, whether or not the effective code density obtained at S92 is equal to or more than a threshold is determined (S93).

If the density is equal to or more than the threshold, the current lens position is considered to be in the effective range (Yes of S93), the focusing degree is obtained in the focusing degree calculation part 16D (S94), and whether or not the obtained focusing degree is the maximum value is determined (S96). In the case of the maximum value, the control is ended because the focusing position is obtained. On the other hand, in the case of not the maximum value, the lens is moved (S95) and the processing is repeated from S90 again.

If the density is equal to or less than the threshold, the current lens position is considered to be in an ineffective range (No of S93), and it is known that the lens position is not suitable for focusing. Therefore, the lens is further moved (S95). In this manner, when the lens position is in the ineffective range, the lens is moved without calculation of the focusing degree, and thereby, the processing time to focusing may be shortened. Note that the focusing degree maybe calculated even in the ineffective range.

In related art, the focus lens position based on the focusing degree is obtained without determination of the effective range or the ineffective range of the lens position, and it is impossible to accurately obtain the lens position. Further, the configuration of calculating the focusing degree within the whole lens movable range is employed, and time is taken for focusing. On the other hand, in the invention, whether the lens position is in the effective range or in the ineffective range is obtained, and thereby, the lens focusing position may be accurately obtained. Further, the configuration of calculating the focusing degree in the lens position determined as being the effective range and not calculating the focusing degree in the lens position determined as being the ineffective range is provided, and thereby, the lens control time to focusing may be shortened.

Further, the embodiment has an advantage in that the focusing position may be appropriately obtained and the processing time and cost may be reduced particularly under a situation of low illuminance in which the focusing degree affected by noise or the like is obtained. Therefore, employment of the embodiment in the case of determination of the situation of low illuminance is considered, and the invention may be employed under other situations than the low illuminance.

Embodiment 2

Figure 10:
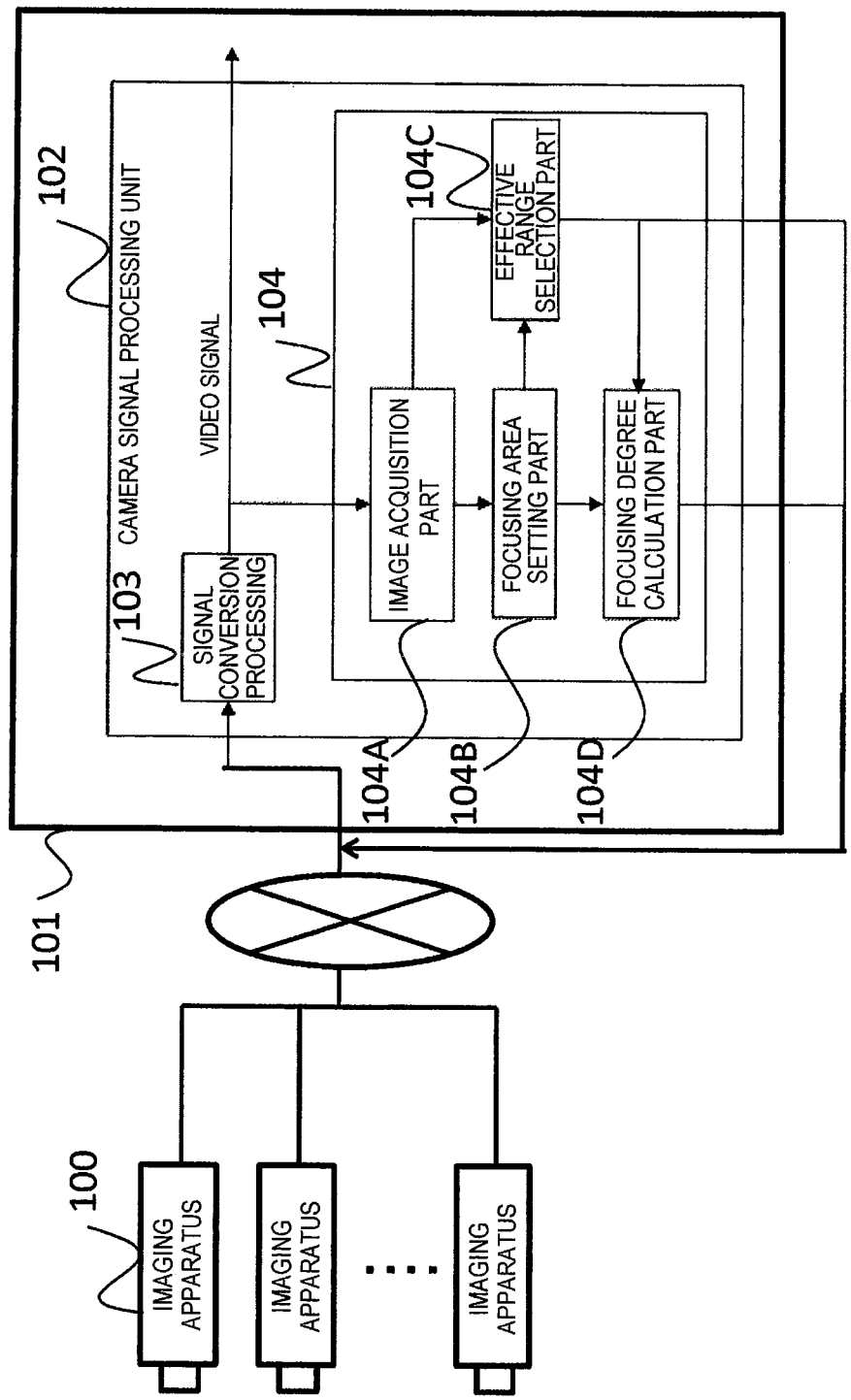
FIG. 10 shows a monitoring system on which the invention according to embodiment 2 is mounted.

In the embodiment 1, the example in which the camera signal processing unit 10 is provided within the imaging apparatus is shown, however, the camera signal processing unit 10 may be provided in a monitoring device 101 or the like connected via a network shown in FIG. 10.

FIG. 10 shows a monitoring system on which the invention according to the embodiment 2 is mounted. As below, the explanation of the same configuration as that in FIG. 1 will be omitted. A plurality of imaging apparatuses 100 are connected to the monitoring device 101 via the network. A camera signal processing unit 102 is provided in the monitoring device 101. By employment of the configuration, the invention may be embodied by providing the camera signal processing unit 102 according to the invention in the monitoring device 101 without newly providing the camera signal processing unit 102 in the imaging apparatus 100.

What is claimed is:

1. An imaging apparatus that performs focus control, comprising:
   a signal conversion processing part that converts a subject image into a video signal;
   an image acquisition part that acquires the video signal output from the signal conversion processing part;
   a focusing area setting part that sets a focusing area as an evaluation value calculation area on an imaging screen acquired by the image acquisition part;
   an effective range selection part that obtains effective code density in an image of the focusing area with respect to each lens position while moving the lens and determines whether or not the lens position is in an effective range suitable for focusing based on the effective code density;
   a focusing degree calculation part that obtains a focusing degree in the lens position when a determination that the lens position is located in the effective range is made in the effective range selection part; and
   a lens control part that performs control of the lens position based on the focusing degree.

2. The imaging apparatus according to claim 1, wherein the focusing degree calculation part does not obtain the focusing degree in the lens position when a determination that the lens position is located outside the effective range is made in the effective range selection part.

3. The imaging apparatus according to claim 1, wherein the effective range selection part determines whether or not the lens position is in the effective range suitable for focusing based on magnitude of an effective code in place of the effective code density.

4. The imaging apparatus according to claim 1, wherein the effective code density is a value of density of an effective code in the focusing area using a code with which a brightness difference between an arbitrary pixel and an adjacent pixel to the arbitrary pixel is larger than a threshold as the effective code of orientation codes obtained by quantification of a brightness gradient orientation in which brightness change between the arbitrary pixel and the adjacent pixel to the arbitrary pixel is the maximum.

5. The imaging apparatus according to claim 1, wherein, when a focusing position is obtained based on the focusing degree in the focusing degree calculation part, the golden section method is used.

6. An imaging apparatus that performs focus control, comprising:
   a signal conversion processing part that converts a subject image into a video signal;
   an image acquisition part that acquires the video signal output from the signal conversion processing part;
   a focusing area setting part that sets a focusing area as an evaluation value calculation area on an imaging screen acquired by the image acquisition part;
   an effective range selection part that obtains effective code density in an image of the focusing area with respect to each lens position while moving the lens and determines whether or not the lens position is in a first range suitable for focusing based on the effective code density;
   a focusing degree calculation part that obtains a focusing degree in the lens position when a determination that the lens position is located in the first range is made in the effective range selection part; and
   a lens control part that performs control of the lens position based on the focusing degree.

7. An imaging method for performing focus control, comprising the steps of:
   converting a subject image into a video signal;
   setting a focusing area as an evaluation value calculation area on an imaging screen acquired based on the video signal;
   obtaining effective code density in an image of the focusing area with respect to each lens position while moving the lens and determining whether or not the lens position is in an effective range suitable for focusing based on the effective code density; and
   obtaining a focusing degree in the lens position when a determination that the lens position is located in the effective range is made.

8. An imaging system comprising:
   an imaging apparatus that images within a monitoring area;
   a signal conversion processing part that converts a subject image into a video signal;
   an image acquisition part that acquires the video signal output from the signal conversion processing part;
   a focusing area setting part that sets a focusing area as an evaluation value calculation area on an imaging screen acquired by the image acquisition part;
   an effective range selection part that obtains effective code density in an image of the focusing area with respect to each lens position while moving the lens and determines whether or not the lens position is in an effective range suitable for focusing based on the effective code density; and
   a focusing degree calculation part that obtains a focusing degree in the lens position when a determination that the lens position is located in the effective range is made in the effective range selection part.

9. The imaging apparatus according to claim 2, wherein the effective range selection part determines whether or not the lens position is in the effective range suitable for focusing based on magnitude of an effective code in place of the effective code density.

* * * * *